June 2, 1959 W. HATTON 2,889,410

PARTY LINE IDENTIFICATION SYSTEM

Filed Aug. 24, 1954 2 Sheets-Sheet 1

INVENTOR
WILLIAM HATTON
BY Percy P. Lantzy
ATTORNEY

June 2, 1959 W. HATTON 2,889,410

PARTY LINE IDENTIFICATION SYSTEM

Filed Aug. 24, 1954 2 Sheets-Sheet 2

INVENTOR
WILLIAM HATTON
BY Percy P. Lantzy
ATTORNEY 2,889,410

PARTY LINE IDENTIFICATION SYSTEM

William Hatton, South Orange, N.J., assignor to International Telephone and Telegraph Corporation, Nutley, N.J., a corporation of Maryland Application August 24, 1954, Serial No. 451,791

12 Claims. (Cl. 179—17)

This invention relates to telephone systems and more particularly to improvements in systems for identifying subscribers on party lines, this being a continuation-in-part of my copending application, Serial No. 387,987 filed October 23, 1953.

Various arrangements have been proposed heretofore for identification of party line stations, for example, arrangements have been proposed at the central office to test a calling subscriber's party line station for identification and other arrangements have been proposed to provide identification signals either upon the lifting of the subscriber receiver or during a subsequent dialing operation. Such arrangements, however, are objectionable either because of the amount of test equipment required at the central office or because the signaling means are either limited to a very small number of party line stations for a given line, or are too bulky or require a local source of power.

One of the objects of this invention is to provide an improved system of subscriber station identification for party lines having a relatively large number of subscribers; and a further object is to provide a signaling device at each substation which is relatively small and which requires but little power for operation.

One of the features of the invention is the provision of a low-drain audio oscillator at the party line station which obtains its input power from the central office and responds to the dialing operation to transmit identifying frequency signals to the central office. The oscillator employs a transistor and other circuit components which require a minimum of space and yet generates frequency signals efficiently. By coupling the output terminals of the oscillator across the dial contacts the station receiver and transmitter are shunted out during transmission of the identifying signal so that the audio frequency thereof is not heard by the calling party.

The above-mentioned and other features and objects of this invention and the manner of attaining them will become more apparent by reference to the following description taken in conjunction with the accompanying drawings, wherein.

Figure 1:
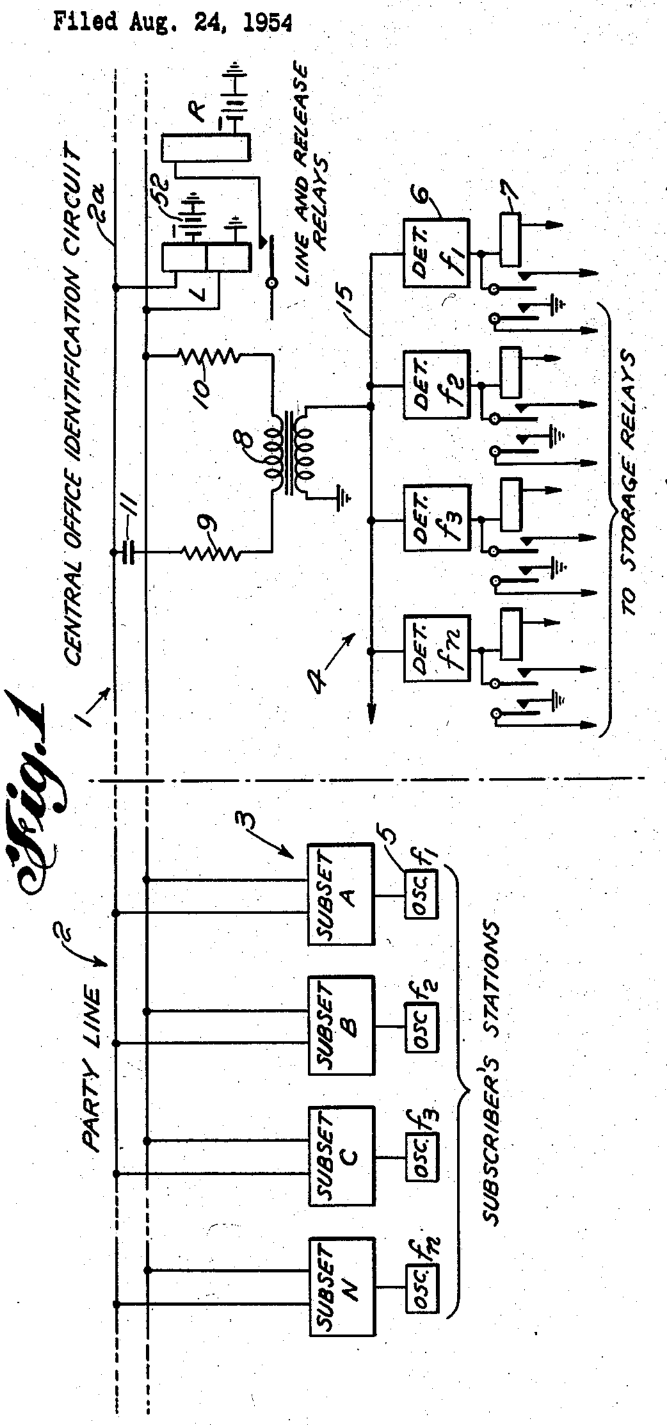
Fig. 1 is a block diagram showing a party line having a plurality of subscriber stations coupled to a central office having means for identifying signals transmitted from the subscriber stations.

Referring to Fig. 1 a portion of an automatic telephone system is shown to illustrate the principles of this invention. The drawing shows a portion of a central office 1 and a party line 2 coupled thereto, the party line having a plurality of subscriber stations 3 (A to N), four such stations being illustrated in block form. The central office which contains the usual line finders, selectors, registers and metering devices is also provided with a bank of signal audio frequency detectors 4 corresponding in number to the number of subscriber stations 3. Each of the subscriber stations is provided with an audio oscillator as indicated at 5, the oscillator being operable at an audio frequency assigned for identification of the station. The subscriber station A, for example, is provided with a signal frequency $f_1$ while station B is provided with signal frequency $f_2$ and so on to station N which is provided with signal frequency $f_n$. The corresponding detectors 4 at the central office are likewise provided for detection of signals of frequencies $f_1$, $f_2$, $f_3$, . . . $f_n$, respectively. When detector 6, for example, detects a signal of frequency $f_1$ it passes current through its associated relay 7 to energize circuitry usually connected with indicating, metering or recording devices at the central office. The bank of detectors 4 are coupled across the party line 2 by means of transformer 8 and isolating resistors 9, 10 and capacitor 11.

Figure 2:
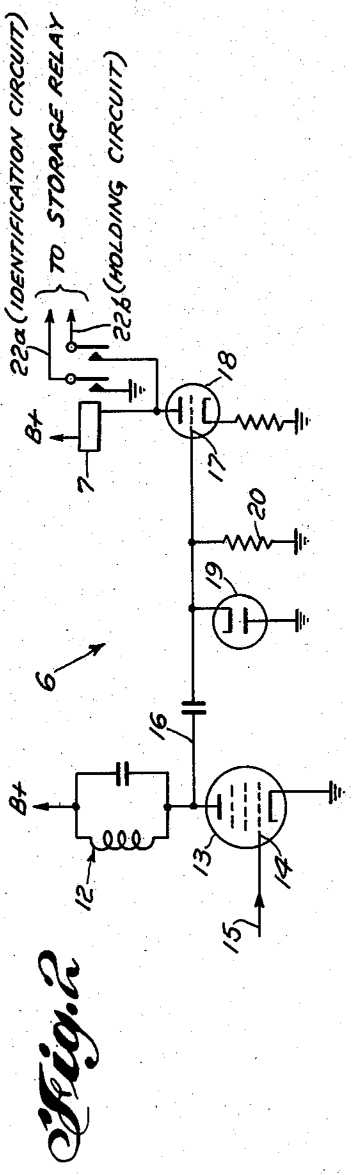
Fig. 2 is a schematic diagram of one of the frequency signal detectors at the central office.

Referring to Fig. 2, a schematic illustration is shown of one of the detectors such as 6, Fig. 1. The detector comprises a tuned circuit 12 which is provided in the plate circuit of a vacuum tube 13. The output of transformer 8 is applied to the grid 14 by connection 15. If the incoming frequency signal corresponds to the resonant frequency of the circuit 12, an amplified signal is fed over circuit 16 to the grid 17 of a second vacuum tube 18. The signal is rectified through diode 19 connected between the circuit 16 and ground thereby developing a voltage drop across resistor 20 which in turn provides a bias on grid 17 of tube 18. This bias causes the tube 18 to conduct thereby energizing relay 7 closing the contacts **22*a* of the associated circuit 22 and also contacts 21*a* of holding circuit 22*b*, thereby indicating or otherwise recording the identity of the station making a call over party line 2**. While a particular detector circuit is here shown, it will be readily recognized by those skilled in the art that any suitable type of audio detector may be employed.

Figure 3:
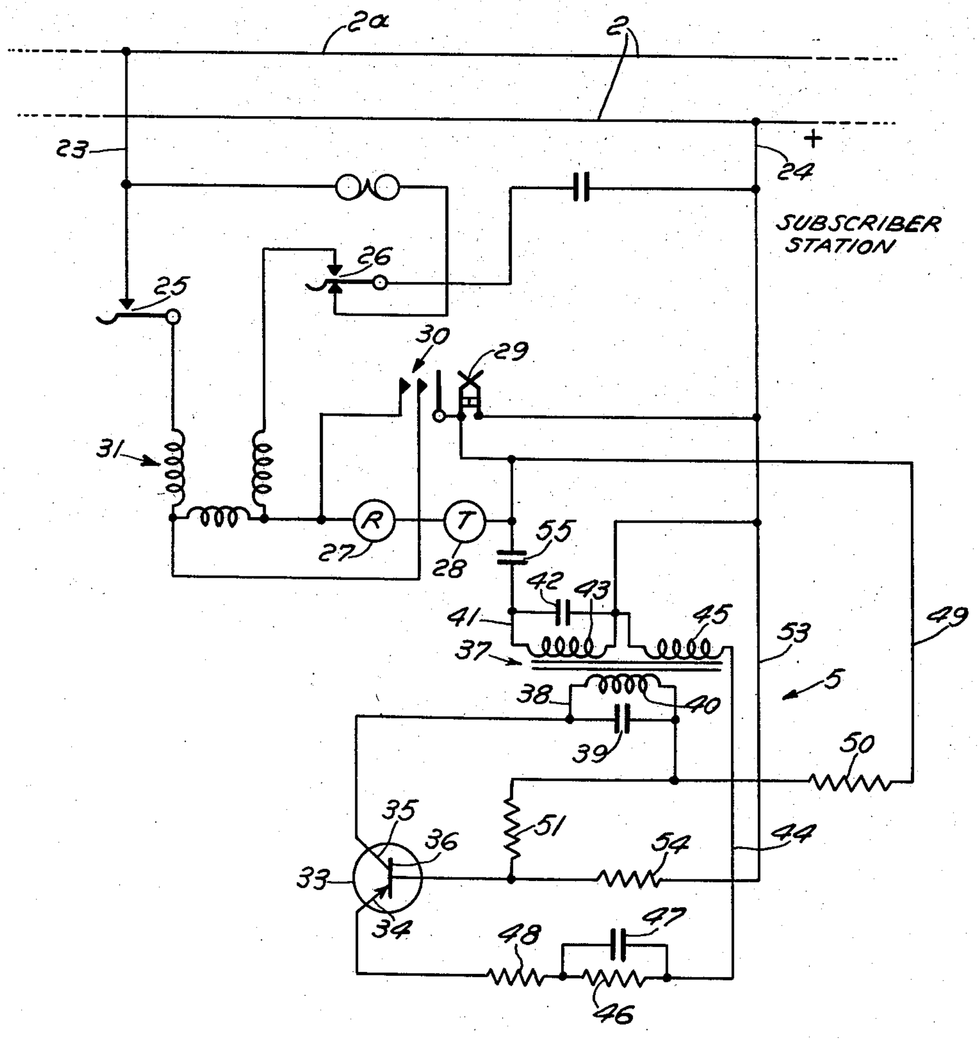
Fig. 3 is a schematic diagram of one of the subscriber stations showing the signal identifying oscillator incorporated therein.

Referring to Fig. 3 a schematic illustration is presented of one of the subscriber stations 3 incorporating a station identifying oscillator. The subscriber station is connected across the party line 2 by connections 23 and 24 as shown. The station may comprise a standard subset having receiver control contacts 25 and 26, a receiver 27, a transmitter 28, and dial contacts 29. The dial contact mechanism is provided with the usual shorting contacts 30 whereby the transmitter and receiver are shorted out during movement of the dial and actuation of the contacts 29 thereby preventing the occurrence of clicks in the transmitter-receiver circuit. The dial contacts 29 are connected between the lines 23 and 24 and are included in circuit with control contact 25, certain of the inductance coils of inductance bridge 31, receiver 27, transmitter 28 and shorting contacts 30. Prior to the opening of dial contacts 29 the dial cam, not shown, actuates upon movement of the dial the shorting contacts 30 to shunt out the receiver and transmitter so that dial clicks or the identifying audio frequency signal of the associated oscillator 5 will not be applied thereto.

The oscillator 5 associated with the subscriber station is preferably of the type having low-power drain characteristic so that the direct current flowing over line 2 is substantially lower when the dial contacts 29 are open than when they are closed. Such an oscillator may be built in accordance with the disclosure contained in the article by D. E. Thomas, Proceedings of the IRE, volume 40, November 1952, pages 1385 to 1395. The oscillator includes a transistor 33 which may be a point-contact or junction type whichever may be desired. As shown the transistor 33 comprises an emitter 34, a collector 35 and a base electrode 36. The oscillator circuit is of the parallel resonant type, the inductance of the two resonant circuits being provided by the coils of a transformer 37. The first resonant circuit 38 comprises a capacitor 39 and a primary coil 40. The second resonant circuit 41 comprises capacitor 42 and a first secondary coil 43. The feedback circuit 44 includes a second secondary coil 45 which is coupled to the second or output resonant circuit 41, the feedback circuit being connected through resistor 46 and capacitor 47 in parallel and resistance 48 in series to the emitter 34. This circuit connection provides the required negative bias by the rectifying action of the emitter and the rectified current flowing in resistor 46. Input power for the oscillator is provided over circuit 49 from the side of the subscriber station contacts 25 and 30, resistors 50 and 51, and circuit 53 to connection 24. With the receiver removed closing contacts 25 and the dial actuated closing contacts 30, negative battery current is applied to base electrode 36 from battery 52 through line relay L and conductor 2*a*. The first resonant circuit 38 is connected between the collector electrode 35 and the base electrode 36 through resistor 51. Ground is also connected to the base electrode via a circuit 53 which contains a circuit element 54 having preferably a negative resistance characteristic similar to a varistor. The output of the oscillator is taken across the resonant circuit 41 and is connected across the dial contacts 29 through coupling capacitor 55. The oscillator is short circuited by dial contact 29 via conductors 49 and 53. The oscillator consequently remains inactive until dialling takes place.

In operation the oscillator oscillates immediately the dial contacts 29 open. When the first digit is dialled a succession of pulses of audio frequency is modulated at the dial rate and transmitted over the party line 2 to the central office where the detector sensitive to that particular frequency responds and energizes its associated relay. It will be clear that since contacts 30 are closed during actuation of the dial that the receiver and transmitter 27, 28 are shunted out during transmission of the identification signals.

It will be readily apparent from the foregoing description that a large number of party line subscriber stations, such as illustrated in Fig. 3 may be connected to the same party line, the only limitation being the Q of the tank circuits of the detectors 4, and the characteristics of the oscillator. The identification feature of this invention is such that each pulse initiated by the dial of the subscriber station provides identification at the corresponding detector at the central office. While the number being called may comprise several dial operations, each dial pulse will carry the subscribers identifying signal. The detector identifying the signal actuates the associated relay to energize the identification circuit 22*a* and also a holding circuit 22*b*. When the relay 21 responds to a dial signal it may be held in as long as required or until the receiver is returned to its support and the established connection is released.

While I have described above the principles of my invention in connection with specific apparatus, it is to be clearly understood that this description is made only by way of example and not as a limitation to the scope of my invention, as set forth in the objects thereof and in the accompanying claims.

I claim:

1. A telephone party line subscriber station having dial contacts adapted to be connected for operation across a party line and an oscillator operable at a frequency assigned for identification of said station, means coupling said oscillator output across said dial contacts for transmission of identifying frequency signals only when said dial contacts are opened to transmit direct-current circuit interruption pulses.

2. A telephone party line subscriber station comprising a transmitter, a receiver, dial contacts, a receiver control contact for coupling said transmitter, receiver and dial contacts in circuit with a party line when the receiver control contact is closed, an oscillator operable at a frequency assigned for identification of the subscriber station, a power input circuit for said oscillator coupled to said dial contacts to obtain power from said line when said dial contacts are opened and means coupling the output of said oscillator across said dial contacts for transmission to said party line only when said dial contacts are open for transmission of direct-current circuit interruption signals.

3. In a telephone system, a central office, a plurality of subscriber stations, a party line connecting said subscriber stations to said central office, each of said subscriber stations having a receiver control contact and dial contacts, said dial contacts being coupled in circuit with said control contact across said line, an oscillator adapted to generate a station identifying frequency signal when a direct-current circuit interruption signal is transmitted and means coupling said oscillator across said dial contacts, said central office having a plurality of frequency signal detectors one for each of the identifying frequencies of said stations, means for coupling said detectors to said line and means for applying a source of power to said line.

4. In a telephone system according to claim 3, wherein each of said detectors includes first and second electron discharge devices each having grid, anode and cathode electrodes, said first electron discharge device having an anode tank circuit resonant at one of said frequencies, said second electron discharge device having a relay coupled to its output circuit and means coupling said tank circuit to the grid electrode of said second electron discharge device.

5. In a telephone system, a party line, a plurality of subscribers' stations connected for operation across said party line, each subscriber's station having dial contacts connected to said party line, an oscillator operable at a frequency identifying each station respectively, means connecting each oscillator across said dial contacts for transmission of said oscillator frequency only when said dial contacts are opened.

6. The system of claim 5, wherein each station is provided with a transmitter-receiver, a receiver control contact in circuit with said dial contacts and said party line, said oscillator having its output coupled across said dial contacts and its power input connected to said receiver control contact.

7. The system of claim 6, wherein said oscillator is provided with coupled resonant circuits connected across said dial contacts.

8. The system of claim 6, wherein the oscillator is a transistor oscillator receiving power over said party line.

9. The system of claim 6, wherein said oscillator includes a transistor having base, emitter and collector electrodes, and two parallel inter-coupled resonant circuits, one resonant circuit being coupled between said base and collector electrodes and the second across said dial contacts, and a feedback circuit coupled between said second resonant circuit and said emitter electrode.

10. The system of claim 1, wherein said oscillator includes a transistor, said dial contacts normally providing a short circuit across the output of said oscillator.

11. The system of claim 1, wherein said oscillator includes a transistor, a feedback circuit and a circuit resonant to said identifying frequency.

12. A telephone line subscriber station having dial contacts adapted to be connected for operation across a telephone line, an oscillator operable at a predetermined frequency for identifying said station and means coupling the oscillator across said dial contacts for transmission of the identifying frequency only when said dial contacts are opened to transmit direct-current circuit interruption pulses.

References Cited in the file of this patent

UNITED STATES PATENTS

| | | |
|---|---|---|
| 1,864,524 | Bragg | June 28, 1932 |
| 2,228,113 | Hersey | Jan. 7, 1941 |
| 2,277,228 | Hecht | Mar. 24, 1942 |
| 2,283,610 | Mohr | May 19, 1942 |

Disclaimer 2,889,410.—*William Hatton*, South Orange, N.J. PARTY LINE IDENTIFICATION SYSTEM. Patent dated June 2, 1959. Disclaimer filed Apr. 9, 1962, by the assignee, *International Telephone and Telegraph Corporation*.

Hereby enters this disclaimer to claims 1, 2, 3, 5, 6, 7, 8, 10, 11, and 12 of said patent.

[*Official Gazette May 22, 1962.*]